(12) United States Patent
Delgado et al.

(10) Patent No.: US 11,145,182 B2
(45) Date of Patent: Oct. 12, 2021

(54) SYSTEM AND METHOD FOR RESPONDING TO AN ACTIVE SHOOTER

(71) Applicant: Alert Patent Holdings LLC, Juno Beach, FL (US)

(72) Inventors: Hector Delgado, Juno Beach, FL (US); Devon Bradley, Juno Beach, FL (US); Adam Smith, Juno Beach, FL (US)

(73) Assignee: ALERT PATENT HOLDINGS LLC, Jupiter, FL (US)

( * ) Notice: Subject to any disclaimer, the term of this patent is extended or adjusted under 35 U.S.C. 154(b) by 0 days.

(21) Appl. No.: 16/830,776

(22) Filed: Mar. 26, 2020

(65) Prior Publication Data

US 2020/0226913 A1    Jul. 16, 2020

Related U.S. Application Data

(63) Continuation-in-part of application No. 15/704,872, filed on Sep. 14, 2017, now Pat. No. 10,629,062.

(60) Provisional application No. 62/394,249, filed on Sep. 14, 2016, provisional application No. 62/950,840, filed on Dec. 19, 2019.

(51) Int. Cl.
  *G08B 25/01*      (2006.01)
  *G08B 25/10*      (2006.01)
  *G08B 5/36*       (2006.01)
  *G08B 3/10*       (2006.01)
  *H04N 7/18*       (2006.01)

(52) U.S. Cl.
  CPC ............. *G08B 25/016* (2013.01); *G08B 3/10* (2013.01); *G08B 5/36* (2013.01); *G08B 25/10* (2013.01); *H04N 7/185* (2013.01)

(58) Field of Classification Search
  CPC ........ G08B 25/016; G08B 25/10; G08B 3/10; G08B 5/36
  See application file for complete search history.

(56) References Cited

U.S. PATENT DOCUMENTS

| 5,515,419 | A | 5/1996 | Sheffer |
| 5,736,927 | A | 4/1998 | Sttebbins |
| 6,072,396 | A | 6/2000 | Gaukel |
| 6,249,225 | B1 | 6/2001 | Wang |
| 7,019,646 | B1 | 3/2006 | Woodard |
| 8,779,919 | B1 | 7/2014 | Darling |
| 9,251,695 | B2 * | 2/2016 | McNutt ................ G08B 19/005 |
| 9,286,790 | B2 * | 3/2016 | Lyman ..................... G09B 5/04 |

(Continued)

FOREIGN PATENT DOCUMENTS

| EP | 2128833 A1 | 12/2009 |
| GB | 2461920 A | 1/2010 |

(Continued)

*Primary Examiner* — Hoi C Lau
(74) *Attorney, Agent, or Firm* — Jennifer Hayes; Nixon Peabody LLP

(57) ABSTRACT

An automated alert system, device and method designed to deliver crisis notifications within seconds to law enforcement personnel. The alert system and method is designed to enhance the response time to an active shooter scenario, thereby minimizing the number of causalities or victims associated with such dangerous scenarios. The system and method uses combination of various hardware components, cellular automation and partnership with first responders to provide an advanced alert system which ensures quick responses.

14 Claims, 15 Drawing Sheets

(56) References Cited

U.S. PATENT DOCUMENTS

| | | | |
|---|---|---|---|
| 9,514,633 B2* | 12/2016 | McNutt | G08B 25/12 |
| 9,514,634 B2* | 12/2016 | McNutt | G08B 19/005 |
| 9,679,449 B2 | 6/2017 | Wedig | |
| 9,866,703 B2 | 1/2018 | Brown | |
| 9,888,371 B1 | 2/2018 | Jacob | |
| 10,020,987 B2* | 7/2018 | Donovan | H04L 41/069 |
| 10,045,187 B1 | 8/2018 | Soleimani | |
| 10,587,460 B2* | 3/2020 | Donovan | G08B 13/19693 |
| 10,862,744 B2* | 12/2020 | Donovan | G08B 13/19645 |
| 2001/0048364 A1 | 12/2001 | Kalthoff | |
| 2002/0095490 A1 | 7/2002 | Barker | |
| 2002/0143938 A1 | 10/2002 | Alexander | |
| 2003/0025599 A1* | 2/2003 | Monroe | G08B 13/19684 340/531 |
| 2003/0062997 A1 | 4/2003 | Naidoo | |
| 2004/0004543 A1 | 1/2004 | Faulkner | |
| 2004/0086089 A1 | 5/2004 | Naidoo | |
| 2004/0155781 A1 | 8/2004 | Deome | |
| 2004/0212505 A1 | 10/2004 | Dewing | |
| 2005/0001720 A1 | 1/2005 | Mason | |
| 2005/0030174 A1 | 2/2005 | Hess | |
| 2005/0207487 A1* | 9/2005 | Monroe | G08B 13/19693 375/240.01 |
| 2006/0158329 A1 | 7/2006 | Burkley | |
| 2006/0195569 A1 | 8/2006 | Barker | |
| 2006/0195716 A1 | 8/2006 | Bittner | |
| 2007/0072583 A1 | 3/2007 | Barbeau | |
| 2007/0103292 A1 | 5/2007 | Burkley | |
| 2007/0279214 A1 | 12/2007 | Buehler | |
| 2007/0282665 A1 | 12/2007 | Buehler | |
| 2007/0283004 A1 | 12/2007 | Buehler | |
| 2008/0166992 A1 | 7/2008 | Ricordi | |
| 2008/0214142 A1 | 9/2008 | Morin | |
| 2009/0167862 A1 | 7/2009 | Jentoft | |
| 2010/0190468 A1 | 7/2010 | Scott | |
| 2010/0261448 A1 | 10/2010 | Peters | |
| 2011/0018998 A1 | 1/2011 | Guzik | |
| 2011/0111728 A1 | 5/2011 | Ferguson | |
| 2011/0140882 A1 | 6/2011 | Jang | |
| 2011/0319051 A1 | 12/2011 | Reitnour | |
| 2012/0003952 A1 | 1/2012 | Degelsegger | |
| 2012/0064855 A1 | 3/2012 | Mendelson | |
| 2012/0087482 A1 | 4/2012 | Alexander, Sr. | |
| 2012/0092158 A1 | 4/2012 | Kumbhar | |
| 2012/0092161 A1 | 4/2012 | West | |
| 2012/0162423 A1 | 6/2012 | Xiao | |
| 2012/0218102 A1 | 8/2012 | Bivens | |
| 2013/0005294 A1 | 1/2013 | Levinson | |
| 2013/0072157 A1* | 3/2013 | Brewer | H04W 12/069 455/411 |
| 2013/0120133 A1 | 5/2013 | Hicks, III | |
| 2013/0141460 A1 | 6/2013 | Kane-Esrig | |
| 2013/0260825 A1* | 10/2013 | Hagenstad | H04M 1/0202 455/556.1 |
| 2014/0002241 A1 | 1/2014 | Elghazzawi | |
| 2014/0118140 A1 | 5/2014 | Amis | |
| 2014/0120977 A1 | 5/2014 | Amis | |
| 2014/0146171 A1 | 5/2014 | Brady | |
| 2014/0167969 A1 | 6/2014 | Wedig | |
| 2014/0218515 A1 | 8/2014 | Armendariz | |
| 2014/0361899 A1 | 12/2014 | Layson | |
| 2014/0365390 A1 | 12/2014 | Braun | |
| 2014/0368601 A1 | 12/2014 | Decharms | |
| 2014/0368643 A1* | 12/2014 | Siegel | G08B 13/19695 348/143 |
| 2014/0379801 A1* | 12/2014 | Gupta | H04L 67/306 709/204 |
| 2015/0002293 A1 | 1/2015 | Nepo | |
| 2015/0015381 A1* | 1/2015 | McNutt | G08B 19/005 340/287 |
| 2015/0015401 A1 | 1/2015 | Wedig | |
| 2015/0022347 A1 | 1/2015 | Aswath | |
| 2015/0029020 A1 | 1/2015 | Bailey | |
| 2015/0038109 A1 | 2/2015 | Salahshour | |
| 2015/0087256 A1 | 3/2015 | Carter | |
| 2015/0111524 A1* | 4/2015 | South | H04W 4/021 455/404.2 |
| 2015/0112883 A1* | 4/2015 | Orduna | H04L 67/12 705/325 |
| 2015/0137967 A1 | 5/2015 | Wedig | |
| 2015/0137972 A1 | 5/2015 | Nepo | |
| 2015/0170503 A1 | 6/2015 | Wedig | |
| 2015/0204109 A1 | 7/2015 | Ergenbright | |
| 2015/0208220 A1* | 7/2015 | Hulan | H04W 4/90 455/404.1 |
| 2015/0221209 A1 | 8/2015 | Janardhanan | |
| 2015/0288797 A1 | 10/2015 | Vincent | |
| 2015/0288819 A1 | 10/2015 | Brown | |
| 2016/0063783 A1* | 3/2016 | Bruns | G07C 9/00571 340/5.61 |
| 2016/0086481 A1* | 3/2016 | McNutt | G08B 5/36 340/540 |
| 2016/0093197 A1 | 3/2016 | See | |
| 2016/0217679 A1* | 7/2016 | McNutt | G08B 19/005 |
| 2016/0247369 A1* | 8/2016 | Simmons | G08B 7/066 |
| 2016/0373578 A1 | 12/2016 | Klaban | |
| 2017/0070842 A1* | 3/2017 | Kulp | H04L 12/2803 |
| 2017/0084166 A1* | 3/2017 | McNutt | G08B 5/36 |
| 2017/0223302 A1* | 8/2017 | Conlan | G08B 13/19695 |
| 2018/0033288 A1 | 2/2018 | Strack | |
| 2018/0067593 A1 | 3/2018 | Tiwari | |
| 2018/0122220 A1* | 5/2018 | Billig | G08B 25/12 |
| 2018/0201181 A1* | 7/2018 | Cook | B60Q 1/2676 |
| 2019/0027032 A1* | 1/2019 | Arunachalam | G08G 1/0965 |
| 2019/0122533 A1* | 4/2019 | McNutt | G08B 25/12 |
| 2019/0122534 A1* | 4/2019 | McNutt | G08B 21/02 |
| 2019/0180660 A1* | 6/2019 | Mosier | G09G 3/006 |
| 2019/0186225 A1* | 6/2019 | Yuasa | E21B 33/035 |
| 2020/0226913 A1* | 7/2020 | Delgado | G08B 15/00 |
| 2021/0005076 A1* | 1/2021 | Delgado | G08B 25/10 |

FOREIGN PATENT DOCUMENTS

| WO | WO 1994/11853 A1 | 5/1994 |
|---|---|---|
| WO | WO 2001/88872 A1 | 11/2001 |

\* cited by examiner (CONVENTIONAL ACTIVE SHOOTER SCENARIO)

SYSTEM AND METHOD FOR RESPONDING TO AN ACTIVE SHOOTER

CROSS REFERENCE

The present application is a continuation-in-part application of U.S. patent application Ser. No. 15/704,872, entitled "SYSTEM AND METHOD FOR RESPONDING TO AN ACTIVE SHOOTER," filed on Sep. 14, 2017, which claims priority to U.S. Provisional Patent Application No. 62/394,249, entitled "SYSTEM AND METHOD FOR RESPONDING TO AN ACTIVE SHOOTER", filed on Sep. 14, 2016, the contents of which are hereby incorporated by reference in their entirety.

This present application also claims priority to U.S. Provisional Patent Application No. 62/950,840, entitled "SYSTEM AND METHOD FOR RESPONDING TO AN ACTIVE SHOOTER", filed on Dec. 19, 2019, the contents of which are hereby incorporated by reference in their entirety.

FIELD

The present invention relates to security systems and security related methods; to first responder notification systems and methods; and more particularly, to systems and methods for responding to emergency related events, such as an active shooter or other security related occurrences, which requires a response from emergency personnel, such as a law enforcement officer or emergency medical service agent.

BACKGROUND

Active shooter situations, in which an individual actively engages in the killing or attempted killing of people in a confined populated area, are complex situations and difficult for law enforcement agencies to prevent. A U.S. Department of Justice Federal Bureau of Investigation report published in 2013 entitled, "A Study of Active Shooter Incidents in the United States Between 2000 and 2013", indicates that there were an average of 11.4 active shooting events annually. A closer look at the actual numbers per year indicates a higher distribution of the events during the period of 2007 to 2013, 16.4 active shooter events, when compared to the years of 2000 to 2006, where there was an average of 6.4 active shooter events. During that time frame, there were 160 active shooter events resulting in 1,043 wounded, including 486 deaths. The study also indicated that most of the active shooter incidents were rapid, with 60% of those incidents ending prior to police arrival. In fact, most of those incidents ended in five minutes or less.

In 2014 and 2015, there were 20 active shooting incidents each year. The more recent active shooter incidents, such as those carried out in Paris, France or San Bernardino, Calif., seem to indicate that the attacks are evolving into more complex, sophisticated, and more deadly occurrences. Each of these attacks included multiple gunmen, with Paris having 7 to 9 attackers. Moreover, there were indications that such attacks were politically or religiously motivated and possibly funded and sponsored by state terrorism. In 2016, the largest mass shooting occurred in Orlando, where an active shooter occurrence resulted the deaths of 49 individuals, and 50 more wounded. Such trends indicate a need for better police training in order to minimize the number of individual deaths or injuries during an active shooter occurrence.

Most emergency situations require a quick response to best neutralize a dangerous situation. Given the lethality and ability to kill or injury large numbers of people in a short time period, a quick response to active shooter calls is imperative. In fact, the previous plan of delaying entry into an active shooter environment until trained teams of specialty officers arrive, assess the situation, and perform a sweep of the building is believed not to be effective. Getting these teams in place can result in a lot of inherent delay, providing the shooter(s) with more time to accomplish their goal, i.e. inflict more casualties. In addition, law enforcement agencies need the public to be prepared for possible active shooter situations and know how to handle such situations should they arise, including being watchful for active shooter threats. Accordingly, a system and method which allows identification of an active shooter situation and alerts law enforcement agencies quickly so that the law enforcement personnel can arrive at the scene as fast as possible is required.

The present invention attempts to address the need in the art by providing a system and method designed to minimize death or injury resulting from a security related occurrence, such as an active shooter scenario, by decreasing police, or other emergency response agencies, such as fire or medical, response time to an initial active shooter occurrence.

SUMMARY present invention is a proactive automated alert system and method designed to deliver crisis notifications within seconds to end users that are needed to respond to an emergency crisis such as an active shooter, including law enforcement personnel, or other emergency related personnel (fire and medical), or civilians, such as elected officials, and enhance the response time to the emergency service, i.e. an active shooter scenario. The system and method uses combination of various hardware components, cellular automation and partnership with first responders to provide an advanced alert system. While the emergency crisis described throughout the application embodies an active shooter event, the system and methods described herein can be used in other emergency crisis events requiring response from one or more first responders.

As used herein, the term "first responders" refers to individuals from one or more agencies that respond to, or may need to be informed in order to respond to or assist in responding to, an emergency event(s) or other security related occurrence(s) which require an action, including but not limited to federal, state or local law enforcement agencies, fire departments, medical organizations, such as hospitals or other medial related services, or federal, state or local government officials. Such first responders may include, for example, police officer, sheriff, Federal Bureau of Investigation (FBI) agent, U.S. Secret Service agent, U.S. Marshal, Bureau of Alcohol, Tobacco, Firearms, and Explosives (ATF) agent, state coordinators, county coordinators, town coordinators, security guards, harbor police, harbor patrols, firefighters, emergency medical technicians or paramedics, physicians, nurses, homeland security agents, military organizations such as the national guard, federal elected officials, state elected officials, or municipal elected officials.

In an illustrative embodiment, the present invention may include a method of rapidly notifying one or more first responders to respond to an emergency event comprising sending data obtained from an area to be monitored for an emergency event occurrence to a dispatch and monitor station located remote from said area to be monitored for an emergency event occurrence; and sending data from said dispatch and monitor station directly to at least one member of a rapid response network.

In an illustrative embodiment, the present invention may include a system for direct notification to first responders about an emergency event for which action by the first responder is required comprising: a notification control unit configured to receive or send a digital transmittance; a rapid notification unit operatively linked to said notification control unit; a rapid dispatch and monitor station configured to be in operative communication with a rapid response network; said rapid response network comprising at least one electronic device configured to receive and send a message related to said emergency event directly to a first responder.

Accordingly, it is an objective of the invention to provide systems and methods for rapid response to emergency events requiring the attention and response of one or more first responders.

It is an objective of the invention to provide notification systems and methods for rapid response to security related occurrences requiring the attention and response of one or more first responders.

It is yet a further objective of the invention to provide a monitored active shooter tactical immediate response system for the purpose of enhancing the response time to an active shooter scenario.

It is a further objective of the invention to provide a proactive automated alert system designed to deliver crisis notifications within seconds to first responders.

It is a further objective of the invention to provide a proactive automated alert system designed to deliver crisis notifications within seconds to law enforcement personnel.

It is yet another objective of the invention to provide a proactive automated alert method designed to deliver crisis notifications within seconds to law enforcement personnel.

It is a still further objective of the invention to provide a proactive automated alert system designed to enhance the response time to an active shooter scenario.

It is a further objective of the invention to provide a proactive automated alert method designed to enhance the response time to an active shooter scenario.

It is yet another objective of the invention to provide an automated alert system and method designed to deliver crisis notifications within seconds to law enforcement personnel and enhance the response time to an active shooter scenario using cellular technology.

It is a still further objective of the invention provide an automated alert system and method designed to deliver crisis notifications within seconds to law enforcement personnel and enhance the response time to an active shooter scenario using cellular technology and cell phones linked directly to law enforcement personnel.

It is a further objective of the invention to provide a system and method utilizing various hardware components and cellular automation, in partnership with first responders, to provide an advanced, rapid alert system.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
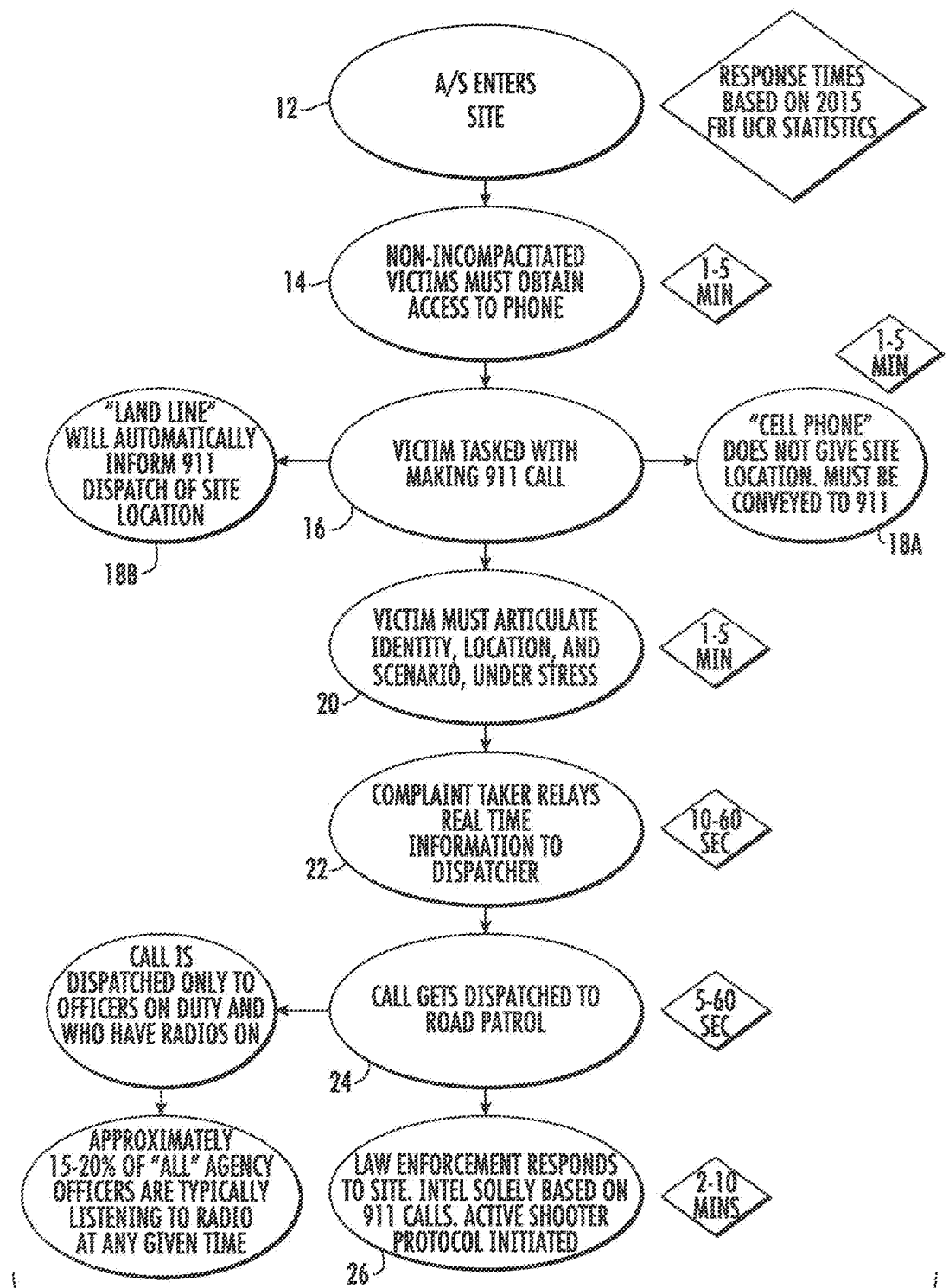
FIG. 1 is a flow chart outlining the steps of a conventional active shooter scenario response.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention relates to response systems and methods that provide notification to one or more first responder(s) in response to an emergency event or crises, or other security related occurrences, which requires action the one or more first responders. As an illustrative embodiment, the emergency event described herein is an active shooter scenario where an individual(s) is in a location firing a weapon at one or more occupants of that location. As such, the system and or methods are referred to herein as an active shooter response (ASR) system. While the emergency event/crisis embodies an active shooter event and is described as an ASR system, the system and methods described herein can be used in other emergency or security related crises or events requiring response from one or more first responders.

The ASR system provides a method in which an individual victim (a person located in an area where the active shooter is targeting, i.e. shooting, or in the line of fire/shooting) or potential victim (a person located in an area where the active shooter may go to target additional individuals, such as another room, a closet, a bathroom, or other locations within the environment) in an active shooter environment can initiate a series of events that result in rapid first responder, such as law enforcement personnel, notification and response. In addition to the rapid response, law enforcement personnel may obtain basic knowledge as to where the active shooter environment is located.

FIG. 1 illustrates the current response to an active shooter. This type of emergency event/crisis begins when an active shooter (A/S) enters an active shooting environment site, see step 12. The active shooting environment site may be, for example, a commercial business (random person entering the business or as a result of disgruntled employee or other workplace violence), government or municipality building, a mall, a school, a school campus, an entertainment building such as a movie theater, a sporting venue such as a football or baseball stadium, a night club, a hospital, or a transportation center such as an airport or train station, port or port facility, or any infrastructure. In the typical active shooter scenario, the shooter (or shooters) enters the site discharging the ammunition/bullets from his/her gun(s), causing instantaneous chaos, fear and disorientation. The individual causing the chaos, fear and disorientation may have a knife or machete in addition to, or in place of a gun. Individuals who are not immediately injured, or are non-incapacitated, must contact emergency personnel to obtain help, see step 14. Based on FBI Uniform Crime Reporting (UCR) statistics, the response time to make a first call for help from the moment the active shooter scenario commences can be from between 1-5 minutes. Typically, the contact is via phone and a call to 911, see step 16. While most people have cell phones, individuals may not always have them on hand in a work environment; some cell phones fail to give location and it is up to the individual caller to provide such information, see 18A. Use of landlines provides emergency personnel with the specific location of the site, see 18B. However, in addition to finding and using a phone, which could expose the individual to harm if the active shooter sees what is occurring, the caller must articulate to the 911 dispatcher what is happening and where the action is occurring, see step 20. The phone call may not provide the 911 dispatcher with clear information, as the caller may be hurt, disoriented, shocked, or under stress and afraid to be seen by the active shooter. As a result, reporting to a 911 dispatcher can generally take between 1-5 minutes, or longer, to complete.

Once the 911 dispatcher obtains enough information, he/she then relays the information about the active shooter scenario to a law enforcement dispatcher, see step 22. This action generally takes about 10-60 seconds. Once the law enforcement dispatcher obtains the necessary information, that information is passed on to police road patrols for response, see 24. This action generally takes about 5-60 seconds. The call to police road patrols is generally sent only to officers on duty and who have their radios on. It is estimated that approximately 15% to 20% of all agency officers are listening to their radio at any given time. Once the call is sent to road patrols, law enforcement responds to the site. The information they obtained from the 911 call is typically the only information they will receive. Once at the site, an active shooter protocol is initiated, see step 26. This action generally takes about 2-10 minutes.

While the conventional active shooter response scenario described in FIG. 1 provides for law enforcement personnel to arrive at an active shooter scene, the response suffers from several deficiencies. The current conventional response to end active shooter scenarios must be rapid response. This entails that a team of law enforcement personnel arrive at the scene as fast as possible, as waiting even several minutes for all personnel to arrive and amass an entry team can result in additional injuries, or worse, more casualties. In addition to rapid response, knowing the situation law enforcement may face is critical to ending the violence with minimal injuries or fatalities. Once one or more law enforcement personnel arrive at a scene, they do not always have or receive reliable information as to what may be happening inside. Law enforcement personnel must, therefore, enter a dangerous situation somewhat blind to what is happening. This situation is dangerous to the law enforcement personnel as well as any non-shooters remaining in the active shooter environment. While current 911 response systems result in a response measure in minutes, such actions may not be fast enough; and given the chaos created, first responders are often in the dark as to what may actually be occurring, i.e. where the shooter is actually located and what he/she looks like, inside the emergency environment. This is critical because there may be many injuries and it may be difficult for law enforcement to tell the difference between the active shooter and others within the active shooting environment.

Figure 2:
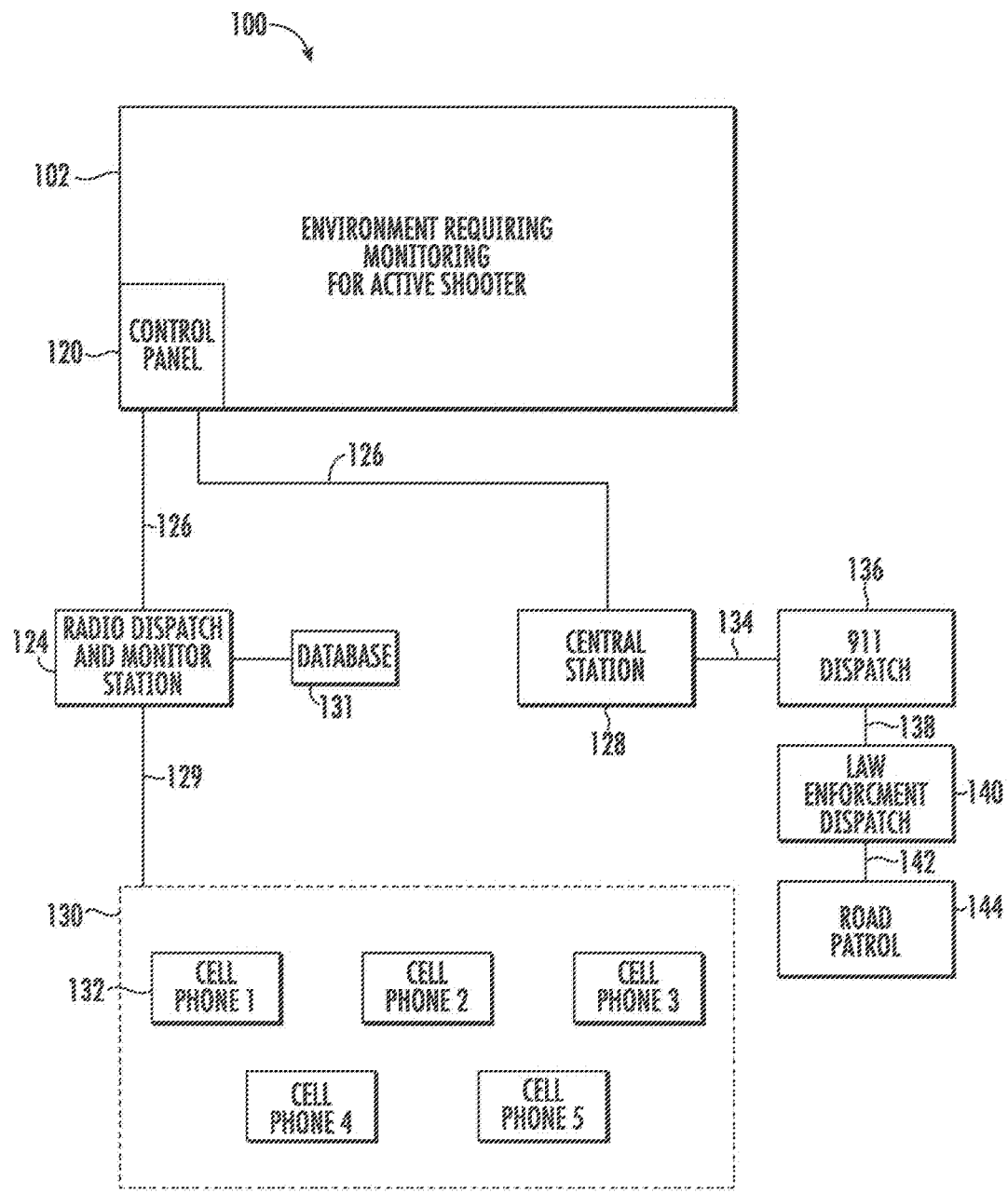
FIG. 2 is a schematic illustration of an embodiment of an active shooter response system in accordance with the present invention.

Referring to FIG. 2, a schematic illustration of an embodiment of an emergency notification response system, referred to generally as active shooter response (ASR) system 100, is illustrated. The active shooter response system 100 contains various hardware components placed at an environment 102 which requires monitoring for an active shooter, as well as other components which are operatively connected to the environment 102 which requires monitoring for an active shooter. Preferably, the operative connection relies on wireless systems and technology, but hardwired systems and technology may be employed. The environment 102 which requires monitoring for an active shooter is illustrated as a business setting having building structure 104, see FIG. 3, housing a plurality of internal offices, referred to generally as 106, and individually as 106A-106l. While the environment 102 which requires monitoring for an active shooter is illustrated as a commercial business structure, other environments such as a school, federal or state government building, a school campus, a night club, restaurant, a sports arena, a movie theater, a music venue, or any other environment that contains people may be used.

An all-purpose room 108 may provide a place for individuals within the company to eat, socialize, or just relax. Offices 106 and the all-purpose room 108 (designated as the inner portion of the inside of the building) may be separated from the entrance 110 of the building 104 via a wall 112 (defined as the outer portion of the inside of the building). Individuals located within the offices 106 are accessible by an internal building door 114. To monitor who enters in and out of the building structure 104, a front desk 116 is placed in the outer portion of the inside the building.

Positioned under the front desk 116 is a rapid notification unit, illustrated herein as a panic button 118. The panic button 118 is operatively connected to a control panel 120. Preferably, the panic button 118 is operatively linked, 122, to the control panel 120 through wireless technology. The wireless technology may be, for example, cellular GSM (Global System for Mobile Communications) communications or other cellular communications, such as, for example CDMA, LTE, 2G, 3G, 4G, and 5G communications. However, wired technology can link the panic button 118 to the control panel 120. In either case, should a user activate the panic button 118, several actions will begin. First, the control panel 120 can be programmed to receive a signal, i.e. from the panic button 118, and notify a rapid dispatch and monitor station or agency 124 through a linked, wireless or wired connection 126 and/or a secondary central station 128. The rapid dispatch and monitor station or agency 124 is linked 129 to a rapid response system network 130 comprising of one or more electronic devices capable of receiving, processing, or displaying said data of one or more first responders 132. The electronic devices could be, for example, smart cell phones (mobile personal computer with a mobile operating system with features useful for mobile or handheld use; smartphones typically have the ability to place and receive voice/video calls and create and receive text messages, have a note-taking application, an event calendar, media player, video games, GPS navigation, digital camera and video camera; smartphones are designed to access the Internet through cellular frequencies or Wi-Fi and can run a variety of third-party software components, such as "apps"; they typically have a color display with a graphical user interface that covers the front surface, the display may be a touchscreen that enables the user to use a virtual keyboard to type words, numbers, and other characters, and press onscreen icons to activate "app" features) or computer tablets. The secondary central station 128 is linked 134 to a 911 dispatcher 136; the 911 dispatcher 136 being linked 138 to a law enforcement dispatch 140, i.e. a local municipality police department. The law enforcement dispatch 140 is linked 142 to one or more road patrol police cars or units 144.

The rapid dispatch and monitor station or agency 124 may be, for example, a remote location that has the hardware (electronic devices such as computers with software systems and databases) configured for receiving and processing all the data received from the one or more components (either from the control panel 120 or directly from each of the individual components) of the active shooter response system 100. The hardware is also configured for transmitting such data to the rapid response system network 130 and, ultimately, to the one or more first responders 132.

Figure 3:
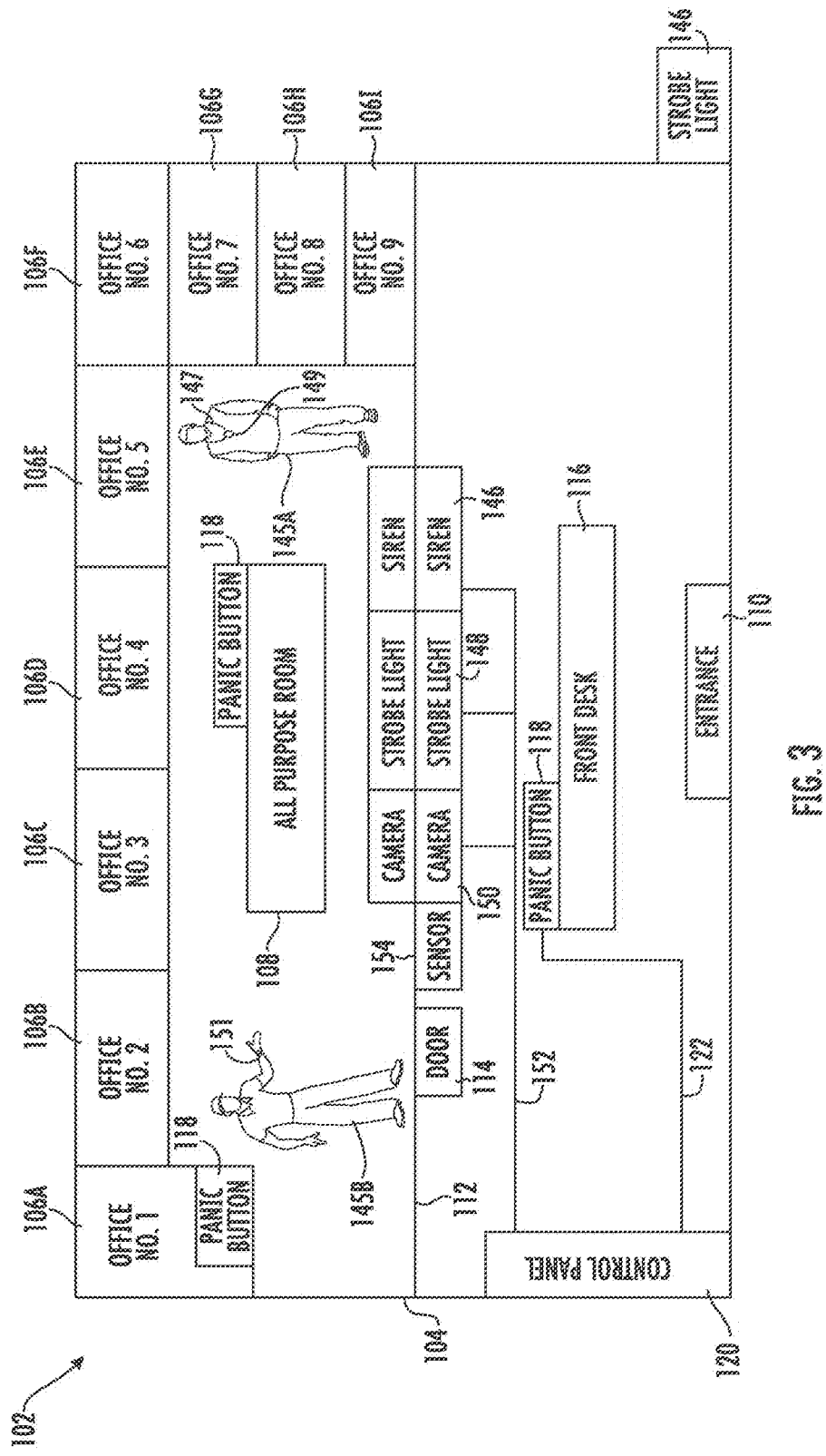
FIG. 3 is an illustrative embodiment of an environment that requires monitoring for an active shooter.

In addition to providing notification to various agencies that form the active shooter response system 100, activation of the panic button 118 may also activate additional hardware components. The active shooter response system 100 may also include an audible device 146, visual indicator device 148, or an image capture device 150 connected 152, wirelessly or wired, to the control panel 120. The audible device 146 may be an audible alarm or siren that produces a noise to alert those inside, as well as outside, the building 104 of a danger. The siren can be programmed to use different sounds or different sound levels. Once one siren is activated, any other siren within the building 104 or associated with the active shooter response system 100 may be triggered. In this manner, should an active shooter begin in one part of a building, i.e., the fourth floor, workers in other parts of the building, for example the third floor or cafeteria, will be alerted of the situation via the siren. The visual indicator device 148 may be a strobe light, such as a blue strobe light designed to disorientate the active shooter and provide notification to a person approaching the building from the outside of the active shooter scenario. In order to disorient the active shooter, the strobe light can be configured to provide flicker vertigo, or the Bucha effect, which causes an imbalance in brain-cell activity as a result of the exposure to low-frequency flickering (or flashing) of a relatively bright light. The image capture device 150 is preferably a camera. A motion sensor (or an infrared motion detector with data/image capture capability) 154 allows the camera to take a still picture upon motion within the room. As shown in FIG. 3, the audible device 146, visual indicator device 148, or an image capture device 150 may be placed on wall 112, but facing the interior portion. Alternatively, the audible device 146, visual indicator device 148, or image capture device 150 may be separated and placed in any location within the building 104. Panic buttons 118 may also be placed anywhere within building, such in an office, see Office 1, 106A, or in the all-purpose room 118. In addition, individuals working within the building may have a portable panic button 118 to be worn around their neck or placed in their pockets. As illustrated in FIG. 3, an individual 145A may be wearing lanyard 147 holding a wearable, portable panic button 149 around the user's neck, or an individual 145B may be wearing wearable, portable panic button 151 around his/her wrist, similar to a watch.

Figure 4:
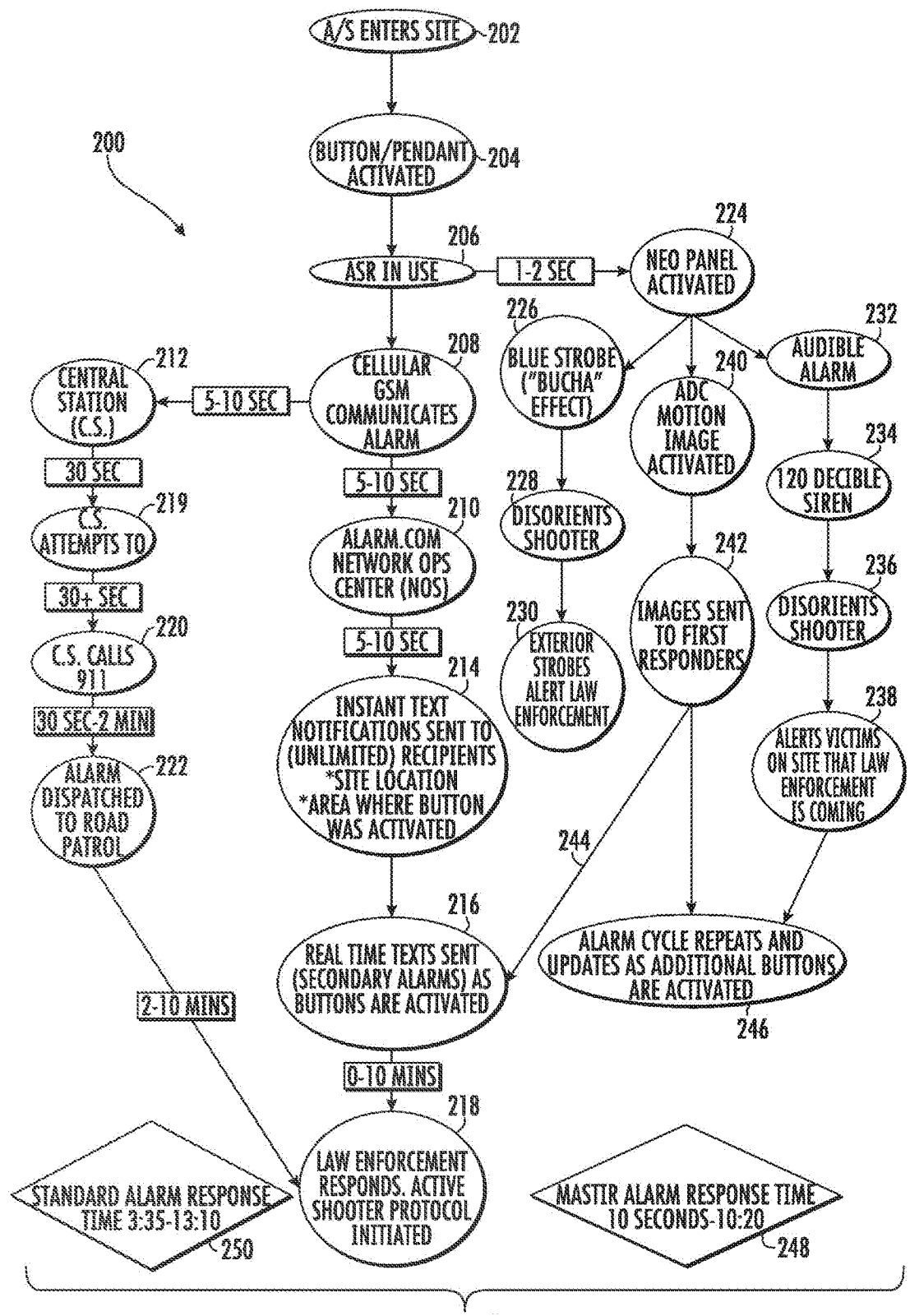
FIG. 4 is a flow chart of an illustrative embodiment of an active shooter tactical response method for responding to an active shooter environment in accordance with the present invention.

FIG. 4 shows an illustrative embodiment of an active shooter response method, referred to generally as a method for rapid response to an active shooter scenario 200, for responding an active shooter environment. As with a conventional response to an active shooter, the method for rapid response to an active shooter scenario 200 begins with an active shooter entering a site, 202. The site contains all the necessary components of the active shooter immediate response system 100, such as described in FIGS. 2 and 3. In the illustrative example, an active shooter enters building 104. As the active shooter enters building 104, a company worker sees the situation and activates the panic button 118, see step 204. Activation of the panic button 118 begins the active shooter response method. The panic button 118 wirelessly communicates with control panel 120. The control panel 120 sends a wireless communication, see step 208, to a rapid dispatch and monitor station 124, see step 210, and to a secondary central monitoring station 128, see step 212. In a preferred embodiment, the signal sent to the rapid dispatch and monitor station 124 or to the secondary central monitoring station 128 is a cellular GSM (Global System for Mobile Communications) network. It will be appreciated that other cellular communication networks may be used including, for example, CDMA, LTE, and other 2G, 3G, 4G and/or 5G communication networks. Alternatively, the panic button may be configured to send a cellular GSM communication or other cellular communication to the rapid dispatch and monitor station 124. The system 100 may use components that utilize Frequency-hopping spread spectrum (FHSS), in which signals are transmitted by rapidly switching carrier among frequency channels. The communications may include one or more of a short message service (SMS), email, a phone call, a push notification or the like. The active shooter response system 100 may be designed to prevent tampering, such as through a crash and smash intrusion. Such system may utilize the system and method described by U.S. Pat. No. 8,395,494, the contents of which are herein incorporated by reference.

The rapid dispatch and monitor station 124 contains a rapid response system 130 for providing a rapid deployment. As an illustrated example, the rapid response system 130 includes a database 131 (see FIG. 2) of cell phone numbers for all law enforcement personnel, such as police officers in predetermined area, predetermined city or municipality, or county. The database 131 may also include email addresses or IP addresses for law enforcement personnel or other electronic devices, such as a tablet, to deliver such information. Once the rapid dispatch and monitor station 124 receives notification, communications through, for example, instant text messages or emails are sent to all personnel in the rapid response system 130, see step 214. Additionally, the rapid dispatch and monitor station 124 may send communications to a tablet at, for example, the 911 dispatch center, a law enforcement office, a police station, a police dispatch center, a site security office, Public Safety Answering Points (PSAPS), and/or the like, as discussed in further detail hereinafter. Accordingly, all law enforcement would receive a notice that there was an active shooter scenario at building 104. To ensure the law enforcement get to the proper place, emergency environment information, such as the site address, as well as the location within the building 104 where the panic button was activated, is provided to the responding law enforcement. As additional panic buttons 118 are pressed, the cell phones of the law enforcement personnel, which form the rapid response system 130, are notified via text or email, preferably in real time, see step 216. All law enforcement personnel seeing the text or email message would then proceed to the building 104 rapidly and activate the active shooter protocol, see step 218.

Figure 5:
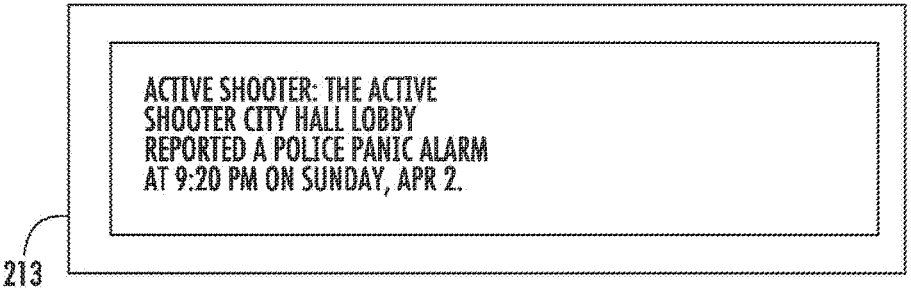
FIG. 5 is a representative screen shot of an illustrative example of the active shooter response method/system communication to a first responder regarding an emergency event.
Figure 6:
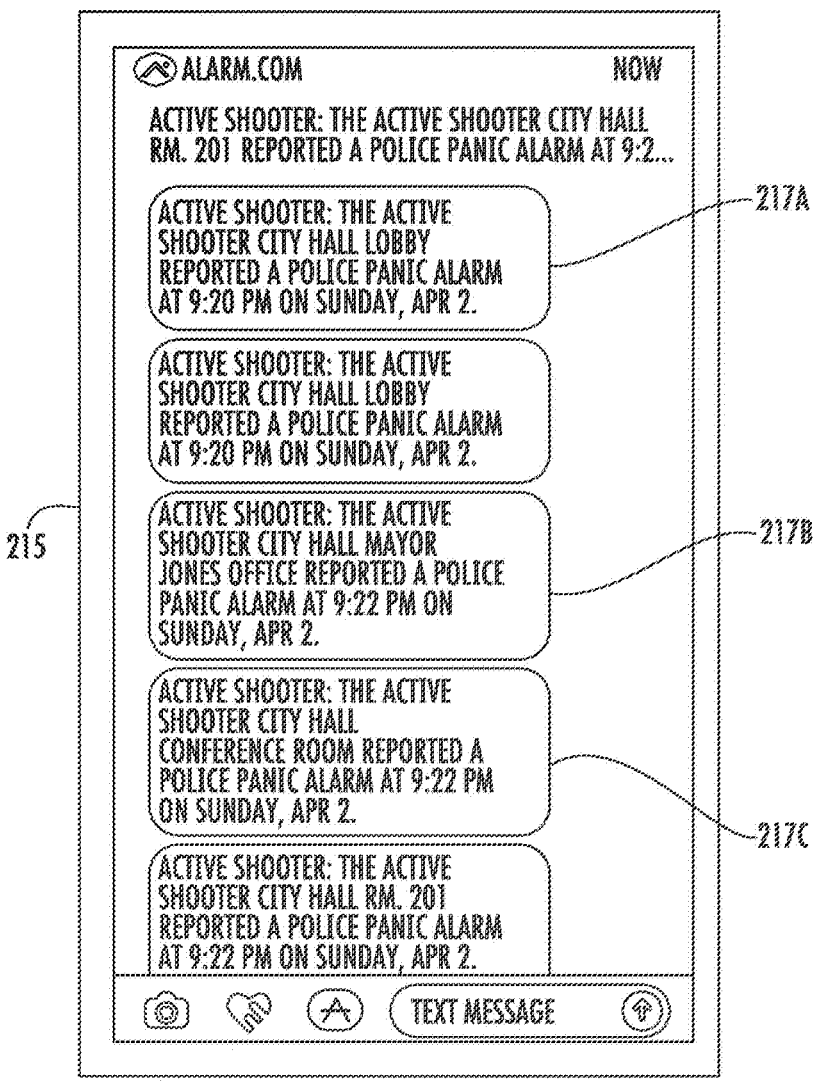
FIG. 6 is a representative screen shot of an illustrative example of the active shooter response method/system communication log to a first responder.

FIG. 5 is an illustrative example of a notification communication 213 a first responder would receive. The notification communication is shown as a text message that would be received by a first responder that is part of the rapid response system 130. The text message is designed to include information that helps the first responder perform his/her job and includes, for example, an indication as to what the incident is, i.e., an active shooter and where the incident is taking place, i.e. at City Hall Lobby. As these incidents tend to be dynamic occurrences and change over time, the first responder may receive a notification communication log 215, see FIG. 6, which includes a plurality of text messages. As shown in FIG. 6, multiple reports about the active shooter has been communicated to the first responder. The first text box 217A indicates the first report of the active shooter at City Hall, via a panic alarm. The third text box 217B indicates that Mayor Jones' office reported the active shooter at City hall. This may indicate that the shooter has moved from the lobby to the location near the Mayor's office. Text block 217C indicates a third report of the active shooter from the City Hall Conference Room.

Once the secondary central station 128 receives the cellular GSM communication or other cellular communication, the central station 128 attempts to contact customer/site first 219, and then calls the 911 dispatcher, see step 220. The 911 dispatcher sends a message to the local law enforcement dispatcher, who then messages road patrols, see step 222. The road patrols notified may proceed to the building 104 rapidly, and activate the active shooter protocol, see step 218.

While individual law enforcement officers are being notified of an active shooter scenario based on the activation of the panic button 118, the control panel 120 is active to perform additional functions, see step 224. The control panel 120 activates the use of the strobe light 148, see step 226. The strobe light 148 is designed to provide a light, preferably blue light, at a wavelength that can disorient the active shooter, see step 228, and provide external notification (strobe light placed on the exterior of the building) to alert law enforcement of the danger as they approach the building. The strobe light may also provide notification to those occupants that are inside of the building, but not at the location where the incident occurred. This would allow those individuals an opportunity to escape the building 104 or move to a remote, safe location inside of the building.

In addition to the activation of a strobe light, an audible alarm 146 is triggered, see step 232. The audible alarm 146 can be a siren set at a particular decibel level, such as 120 decibels, see 234. The decibel level can be set at a particular level designed to disorient the active shooter, 236. The activation of the audible alarm 146 also alerts the individuals on site that there is an active shooter and that law enforcement has been notified and is in route, 238.

Activation of the panic button 118 may also trigger the use of camera 150. Upon activation, the camera may provide a photograph, or multiple photographs, of the situation. The camera may be coupled to a motion sensor so that, upon triggering of the panic button 118 and detection of motion, i.e. movement of the active shooter, photographs are taken, see 240. Any photographs taken by camera 150 are sent to law enforcement personnel or other first responders, see 242. Images may be sent to a police station directly, 244, and to the cell phones of the law enforcement personnel that form the rapid response system 130. The camera 150 may also be configured to provide real time or live images to first responders or provide first responders with videotaped recordings of any action, i.e. the shooter shooting or moving within a particular area of the building 104, as detected by the motion sensor.

Figure 7:
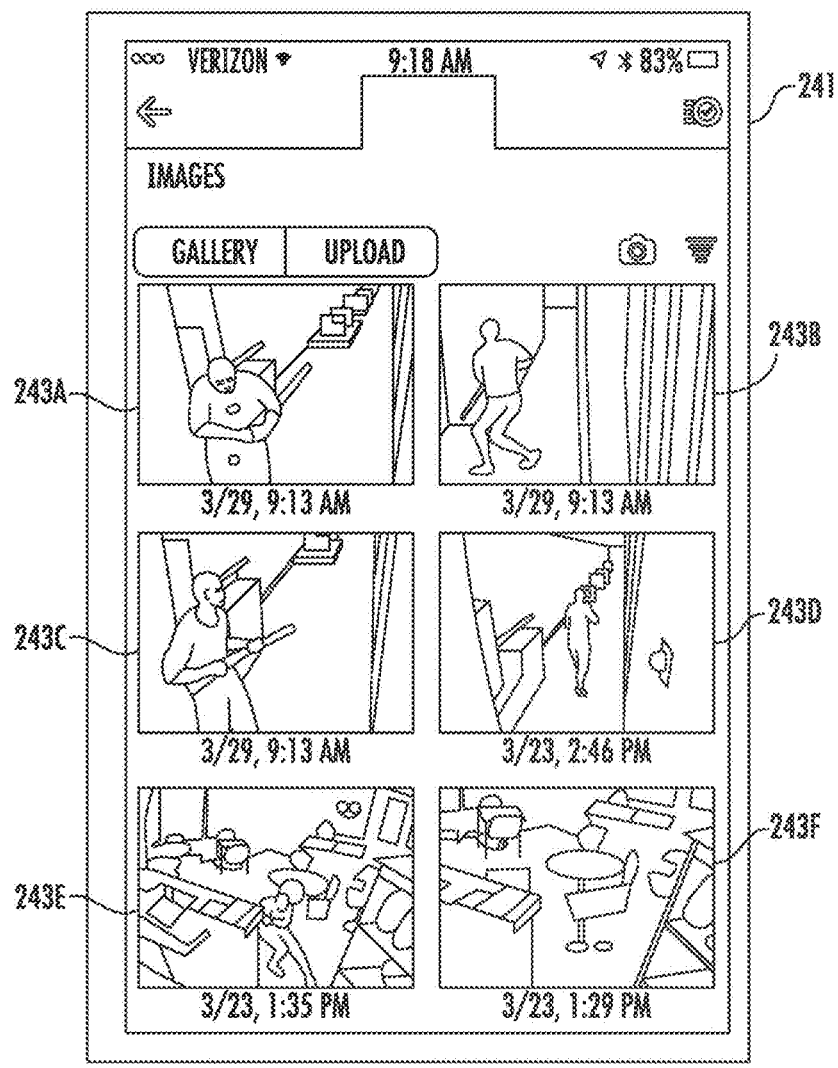
FIG. 7 is an illustrative example of a video log received by a first responder.
Figure 8:
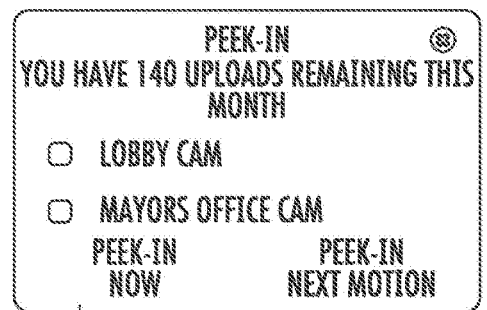
FIG. 8 is a screen shot illustrating a peek-in function.
Figure 9:
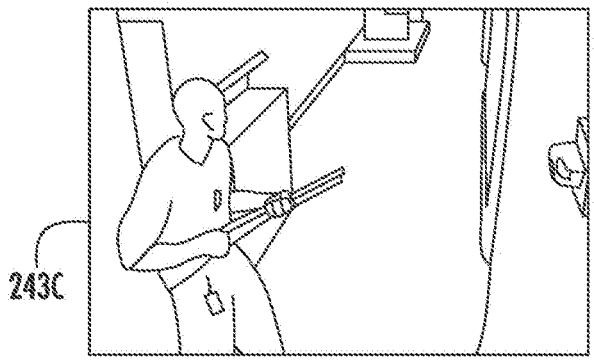
FIG. 9 is a single video image taken from the video log illustrated in FIG. 7.

FIG. 7 is a screen shot of an illustrative embodiment of a video log 241 provided to the first responder as part of the rapid response system 130. The video log 241 provides the first responder with images, 243A-243F obtained from one or more cameras 150 activated as a result of a panic button 18 or sensor activation. Each image may be generated from a specific camera, or the images may be from a single camera. The first responder may be able to see the images as a static image only, as a recorded image showing a predetermined time period. Additionally, the images may allow the first responder to "peek in", access, see FIG. 8, 245, in which case the user is able to view the area shone by the camera in real time, live viewing. FIG. 9 provides a close-up view of image 243C.

As the active shooter moves through the building 104, additional panic buttons 118 may be activated. This allows the alarm cycle to repeat, 246, and updates as the additional buttons are activated. Having the alarm cycle repeat may be important, as it may provide additional images to the law enforcement personnel. More importantly, it may provide responding law enforcement personnel with a more accurate location as to where the active shooter is within the affected environment. As shown in FIG. 4, it is estimated that the current methods will result in a response somewhere between 10 seconds and 10 minutes, 20 seconds 248.

One of the key components of the ASR method and system is the ability to provide rapid and informational notification to individual first responders that form part of the rapid notification unit. This can be critical in various emergency/crisis events. In a case study evaluating the response of an active shooter scenario which resulted in nine deaths, occurring June 2015, at a church near Charleston, S.C., USA, the first unit to arrive on scene occurred 8 plus minutes after the shooting began. A person in the church attempted to call 911 using a cell phone, but was unsuccessful. The first successful call to 911 (from a different individual than the unsuccessful attempt) occurred 5 minutes after the shooter pulled out a weapon and began shooting. Despite an officer being less than one minute from the church when the shooting began, it took eight minutes and eight seconds using the conventional emergency system response for that officer to receive the information and arrive at the site to respond. By that time, the shooting had ended and the shooter escaped. If the church was equipped with the ASR system and methods, it is believed that any person in the church could have activated panic button (such as a wall mounted panic button 118) to begin the notification process. In addition, the first person who attempted to call 911 using a cell phone could have activated portable panic button (see lanyard 147/panic button 149, or watch like panic button 151) rather than attempting to use a damaged phone that was unsuccessful. An audible alarm could have been used to provide sound inside and outside the church and the shooter's comfort zone could have been disrupted by the sirens/strobe. More importantly, a direct text of the incident could have been sent to the officer within 2-10 seconds. In that case, that officer may have been on scene in approximately 1-2 minutes, rather than the 8 plus minutes. In addition, the officer and other first responders may have been notified (more law enforcement agents and paramedics and a local hospital) and also able to review images from an image/motion sensor.

In a second scenario, an individual entered a Florida airport in 2016 and began randomly shooting, killing 5 individuals. First responders were notified of the active shooter via 911 dispatched calls, but only after the shooter had fired all ammunition. Officers in other parts of the airport did not respond because they could not hear the shots being fired. It was determined that there was a law enforcement officer outside the terminal doors of where the shooting took place. He was unable to respond because he did not hear the shots when it began. It was also determined that first responders where confused as to the location of the shooter, and they were actually dispatched to multiple locations due to misinformation. Had the law enforcement officer outside the terminal been directly notified using the ASR system and method, he may have been able to respond within 2-10 seconds.

Figure 10:
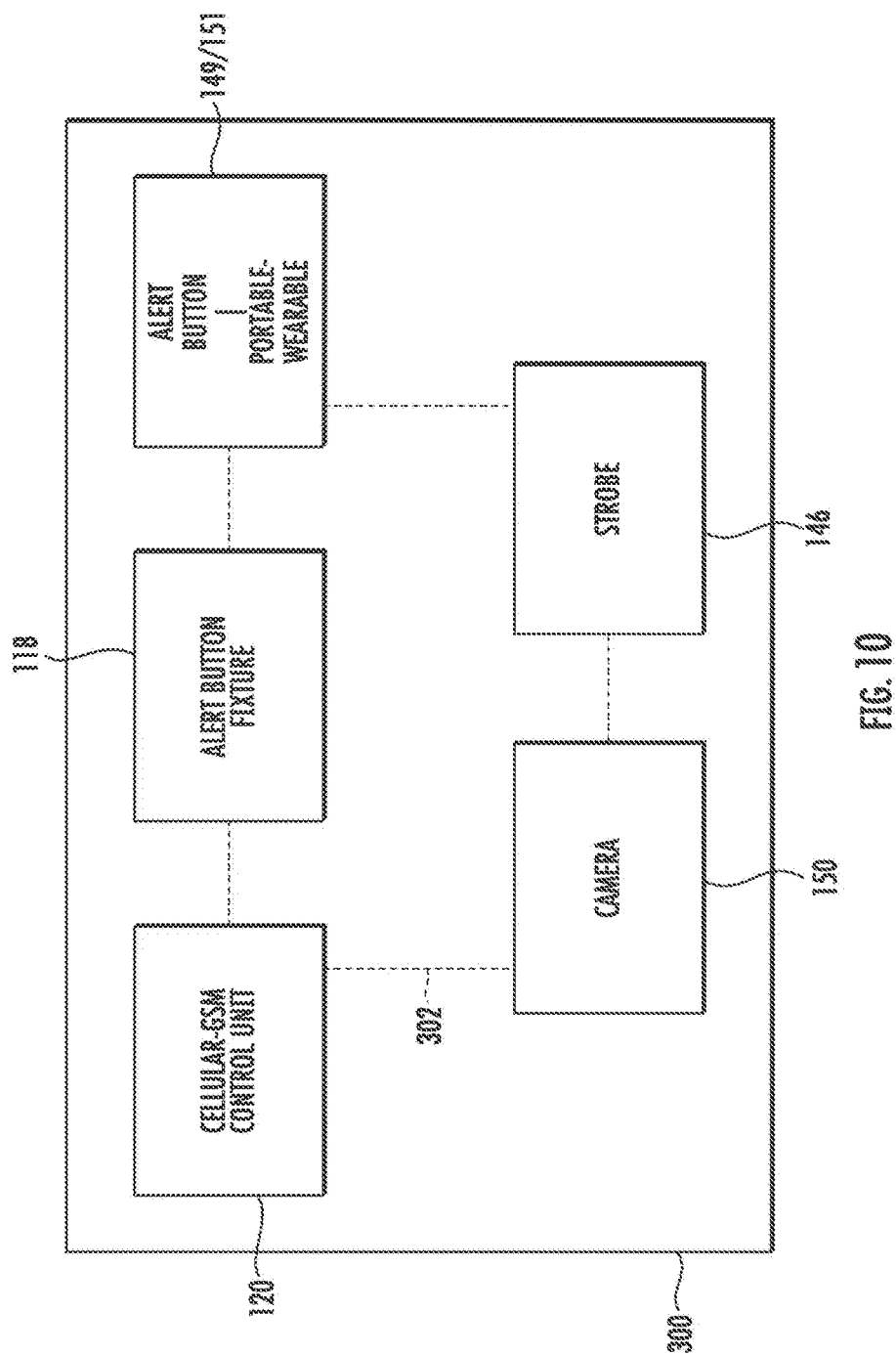
FIG. 10 is a schematic illustration of the components of a portable active shooter response system.

FIG. 10 illustrates a schematic representation of the ASR system 100 shown as a portable system in which one or more individual components are transported in a carrying case 300. The case 300 carries the control panel 120, the siren/strobe light(s) 146, the panic button(s) 118, the portable panic button(s) such as a lanyard 147/panic button 149, or watch like panic button 151, and camera(s) 150. Each of the components are operatively linked together (represented by broken line 302) to function, individually or as a whole system, in any manner as described herein when set up at a site.

Figure 11:
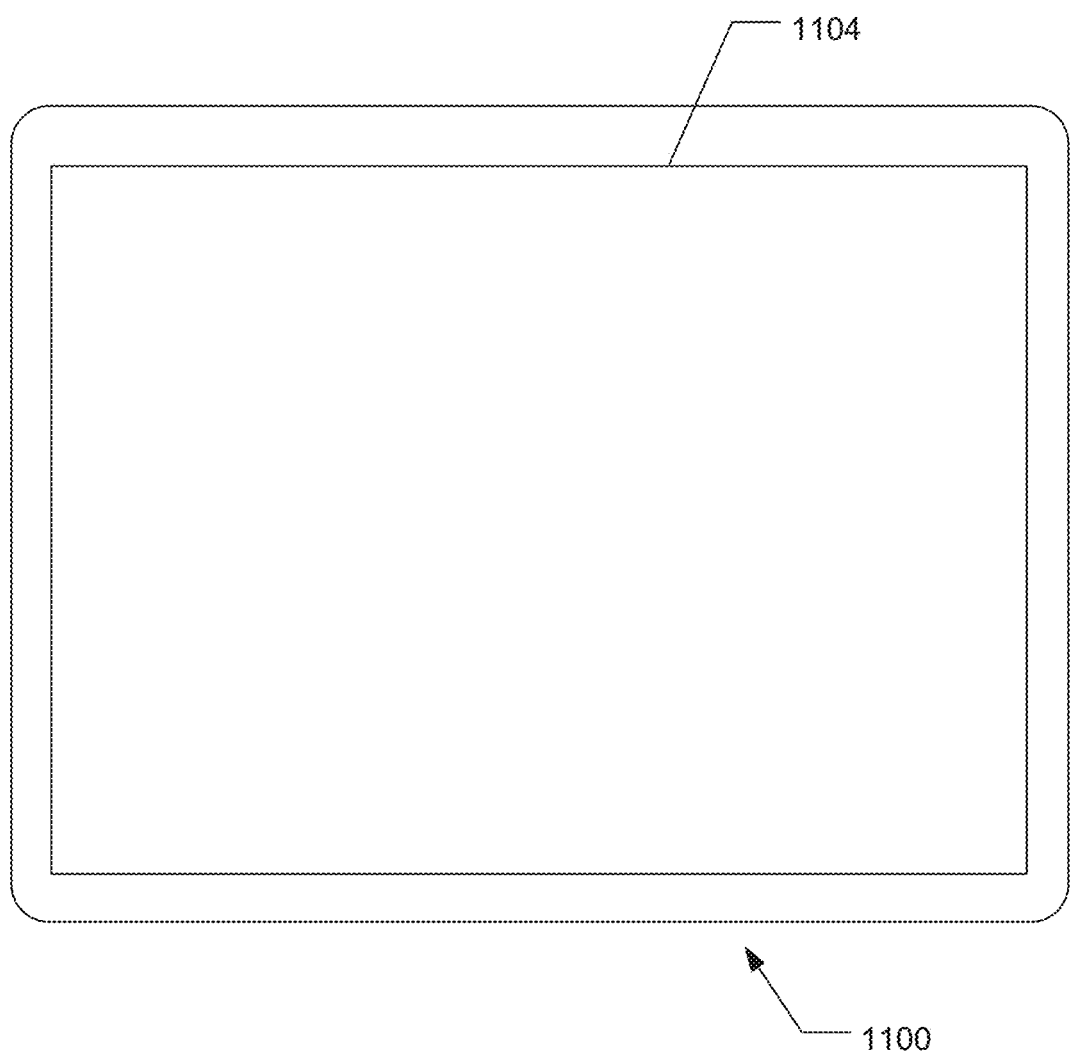
FIG. 11 is a schematic illustration of a dispatch tablet in accordance with one embodiment of the invention.
Figure 12:
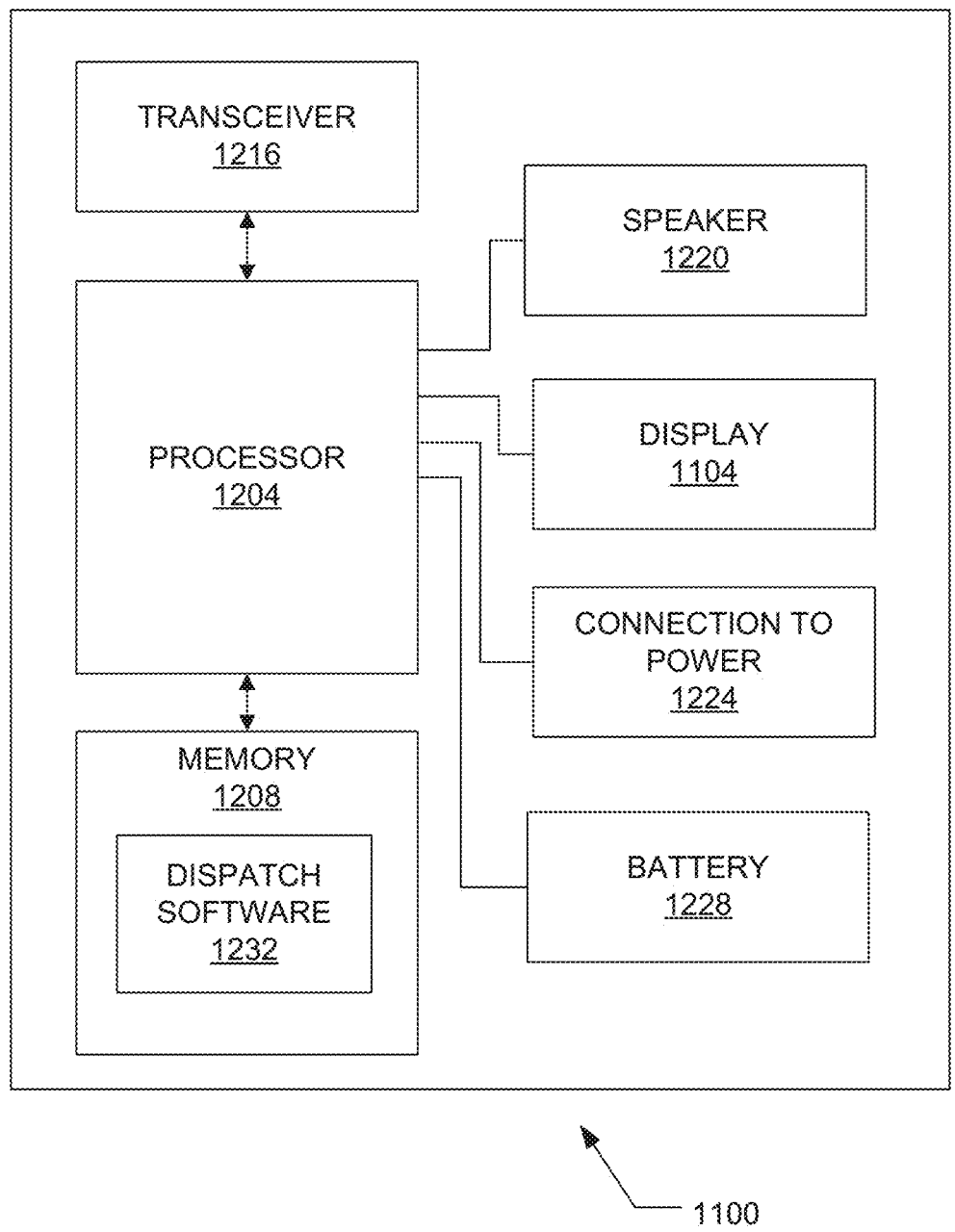
FIG. 12 is an exemplary block diagram of the dispatch tablet.

FIG. 11 schematically illustrates a dispatch tablet in accordance with embodiments of the invention. FIG. 12 is an exemplary block diagram of the dispatch tablet. The tablet 1100 is configured to be a dedicated stand-alone device that can provide instant notification of an incident. The tablet 1100 may be located at, for example, the 911 dispatch center, a law enforcement office, a police station, a police dispatch center, a site security office, Public Safety Answering Points (PSAPS), and/or the like As shown in FIG. 11, the tablet 1100 includes a display 1104. As shown in FIG. 12, the tablet also includes a processor 1204, a memory 1208, a cellular transceiver 1216, a speaker 1220. As shown, for example, in FIG. 12, the cellular transceiver 1216 is coupled to the processor 1204. The memory 1208, speaker 1220 and display 1104 are also coupled to the processor 1204. The display 1104 is also a user interface. The tablet 1100 may further include a connection for an external power supply 1224 and an internal battery 1228. It will be appreciated that the tablet 1100 may include additional components than those illustrated in FIGS. 11 and 12. An exemplary tablet 1100 that may be used is a Lenovo 10.1, Model No. TB-704A.

Because the tablet 1100 includes a cellular transceiver 1216, it is able to communicate over a cellular network and does not require connection to Ethernet. An advantage of using a tablet with a cellular transceiver 1216 is that cellular communications tend to be more secure than Ethernet or other wireless communications and therefore comply with the cyber-security policies of law enforcement agencies.

Figure 13:
FIG. 13 is an exemplary user interface of a kiosk user screen of the dispatch tablet.

The processor 1204 is configured to operate using only dispatch software 1232 stored in memory 1208 and executed on the processor 1204 so that the tablet 1100 can function as an alert notification system. The tablet 1100 may also be configured such that it cannot be powered off. The tablet 1100 is configured to operate in a kiosk mode when there are no active alarm or emergency events. An exemplary screen shot of the kiosk mode display 1300 is shown in FIG. 13. The tablet 1100 may also be configured such that it cannot be manipulated from the kiosk (locked) screen 1300, i.e., that is only used to run the dispatch software during an alarm or emergency.

Figures 14A, 14B:
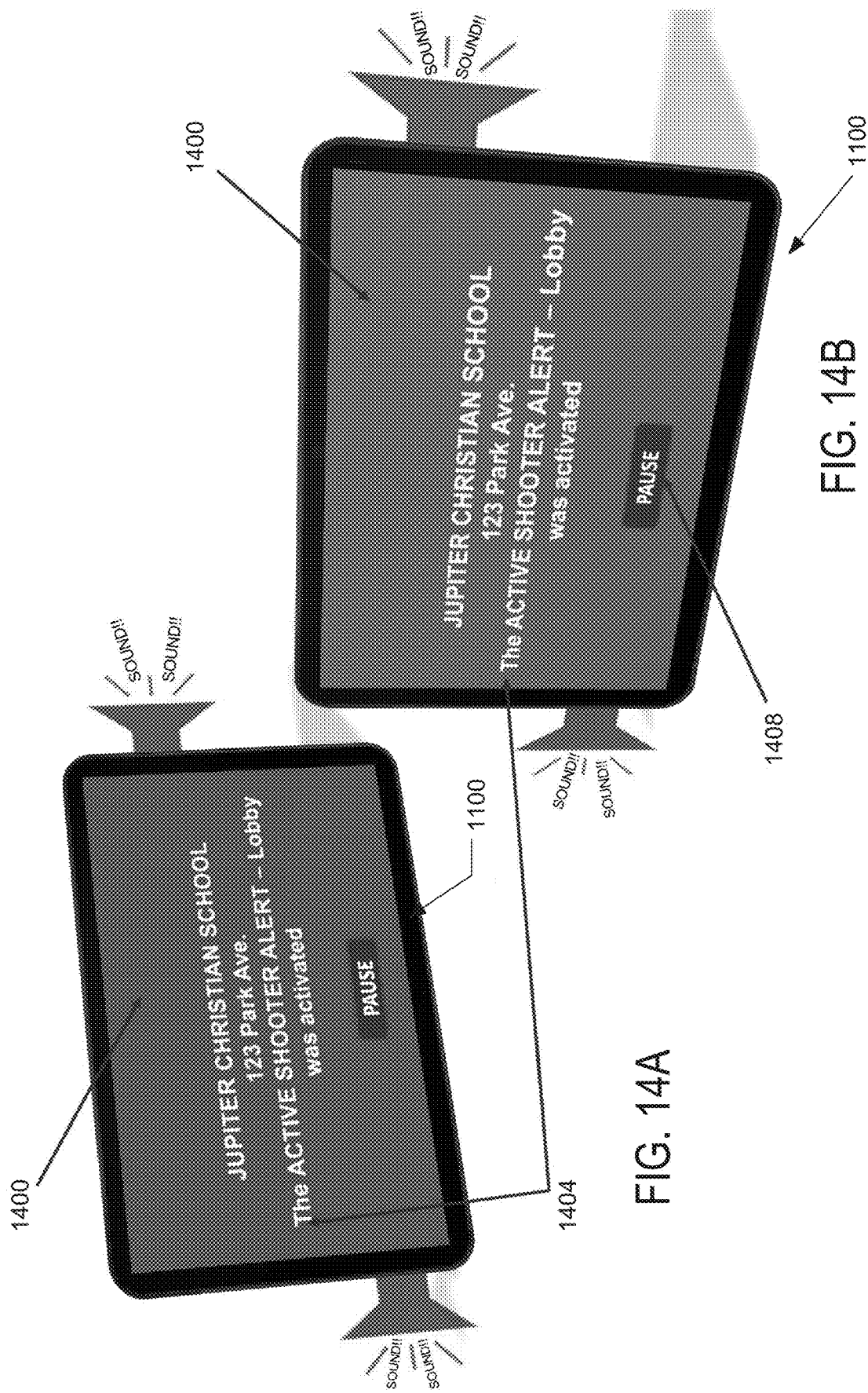
FIGS. 14A-B are exemplary user interfaces of the alarm screens of the dispatch tablet.

In use, the tablet 1100 receives a notification of an alert or alarm event via a cellular communication through the cellular transceiver 1216. That alert or alarm event is provided to the processor 1204 which executes the dispatch software 1232 to generate an audible and visual alert. For example, the speaker 1220 may issue an audible sound corresponding to the audible alert and the display 1104 may display a notification of the alarm or emergency event corresponding to the visual alert. The notification may include text identifying, for example, the location of the incident and other incident information and portions or all of the information received in the notification may be displayed on the tablet's display 1104. For example, the display 1104 may include the location, name, address and description, so that the information can be relayed to first responders. The background color of the display 1104 may also change from the kiosk mode during an alarm event. For example, the background color of the display 1104 in the kiosk mode may be black, but, during an alarm or emergency event, the background color of the display 1104 may alternate between red and blue. Exemplary illustrations of the user interface 1400 of the display during an alert or alarm event are shown in FIGS. 14A-14B. It will be appreciated that the background color of the display 1104 may simply change to red, blue, or any other color (and not alternate), that more than two colors may be used and that the interval in which the screen alternates between the two colors may vary. As shown in FIGS. 14A-B, the user interface 1400 also includes text 1404 describing the alarm or event based on the received notification. As shown in FIGS. 14A-14B, the user interface 1400 may include, a "Return to Home" or "Pause" icon 1408 to silence the audible sound and stop the display from alternating between red and blue but still display the text 1404. If a new alarm notification is received, then the alarm is activated again, i.e., an audible sound is generated and the display is updated to display the notification information and update the background colors, as discussed above. The tablet 1100 allows an operator to dispatches first responders to the location so that they can effectively respond to an incident.

Figure 15:
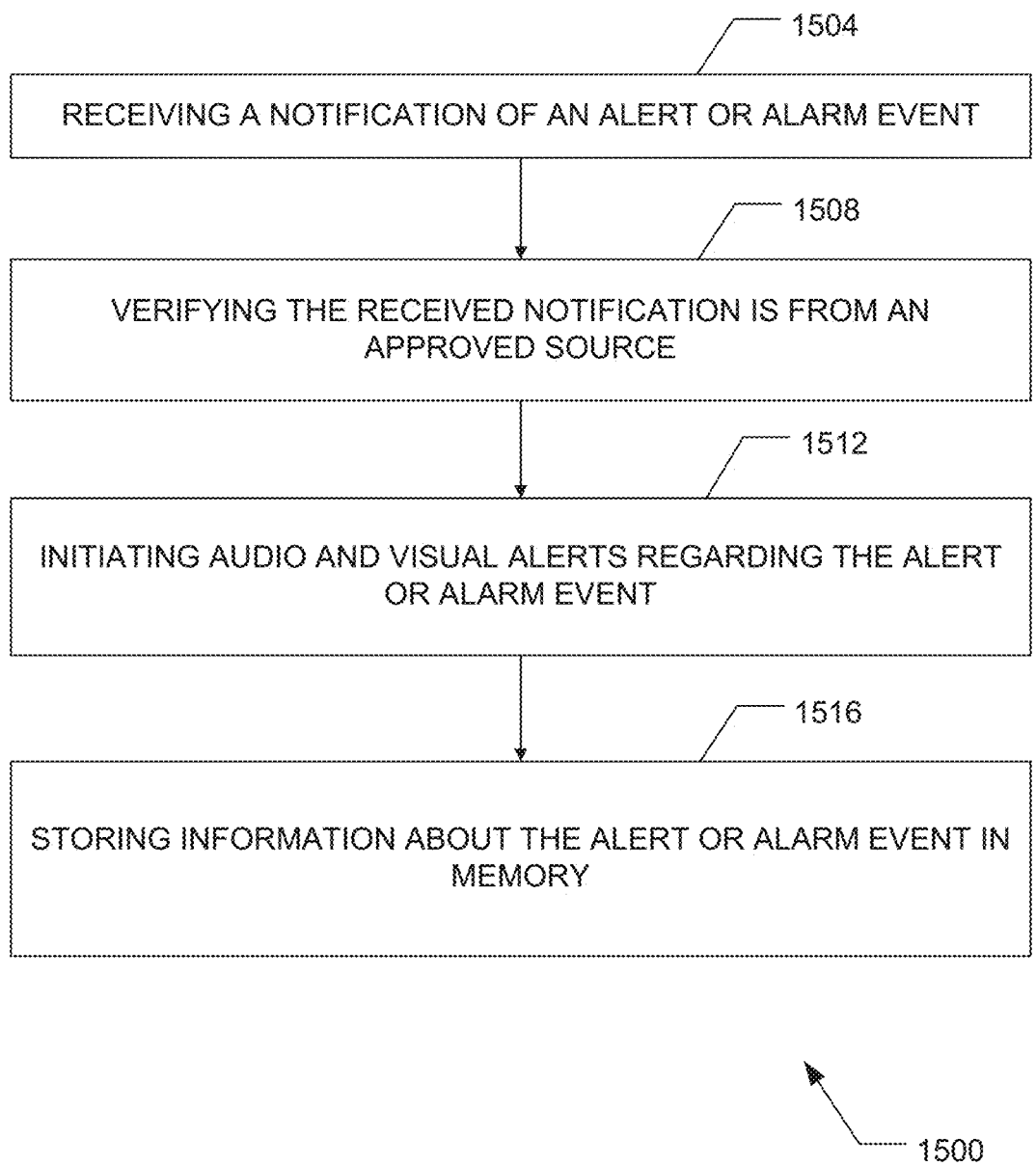
FIG. 15 is an exemplary flow diagram for a process performed by the dispatch tablet.

FIG. 15 is an exemplary flow diagram of a process 1500 performed by the tablet 1100 during an alert or alarm event. As shown in FIG. 15, the process 1500 beings by receiving a notification of an alarm or incident (1504). The notification received at the tablet 1100 may be the same notification received at the remote dispatch and monitor center or central station as discussed above. The tablet may receive the notification directly from the control panel 120 or the remote dispatch and monitor station 124 may deliver the notification to the tablet 1100. In embodiments, where the tablet 1100 receives the notification from the dispatch and monitor station 123, it may receive a subset of the information received at the remote dispatch and monitor station 124 from the control panel 120. In one embodiment, the remote dispatch and monitor station 124 or control panel 120 sends an email to the tablet 1100, which process the email as discussed below.

The process 1500 may continue by verifying that the received notification is from an approved source (1508). For example, the processor may verify that the email address or IP address that sent the notification is on a list of approved sources stored in the memory 1208.

The process continues by initiating audio and visual alerts based on the received notification (1512). In particular, the processor 1204 extracts the information from the notification and generates the audio and visual alerts discussed above. For example, as discussed above, the speaker may issue a sound effect, the original background image may be replaced with full-screen solid-colored images that rapidly alternate in color (e.g., red to blue), and large text may be provided on the display that contains notification details about the alter or alarm.

Figure 16:
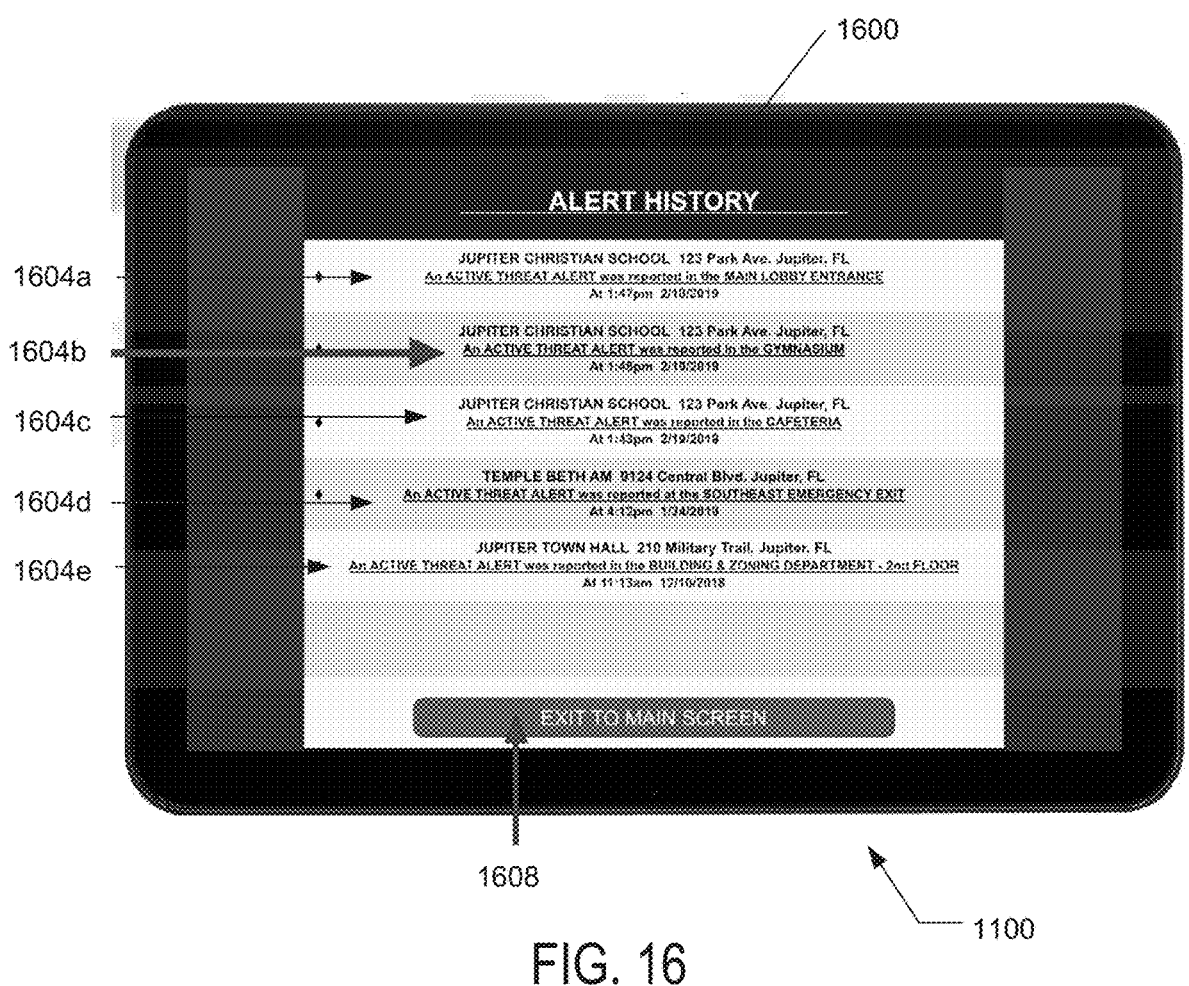
FIG. 16 is an exemplary user interface of the alarm history screen of the dispatch tablet.

The process 1500 may continue by storing information about the alert or alarm in memory (1516). By storing information about the alerts or alarms received at the tablet, it can be used for evidentiary purposes to support criminal investigations and provide accurate timelines about emergency incidents. The information that is stored may include date and time stamps, location information and the like. As shown in FIG. 16, an alert history screen 1600 can be displayed that includes incident history details based on the stored information. In FIG. 16, the incidents 1604a-e are listed in chronological order with date/time stamps. In FIG. 16, an icon ("EXIT TO MAIN SCREEN") 1608 is also provided in the alert history screen 1600 to return to the kiosk mode display 1300. In one embodiment, the alert history screen is accessed from the kiosk mode display 1300, shown in FIG. 13, by selection of icon 1304.

Figure 17:
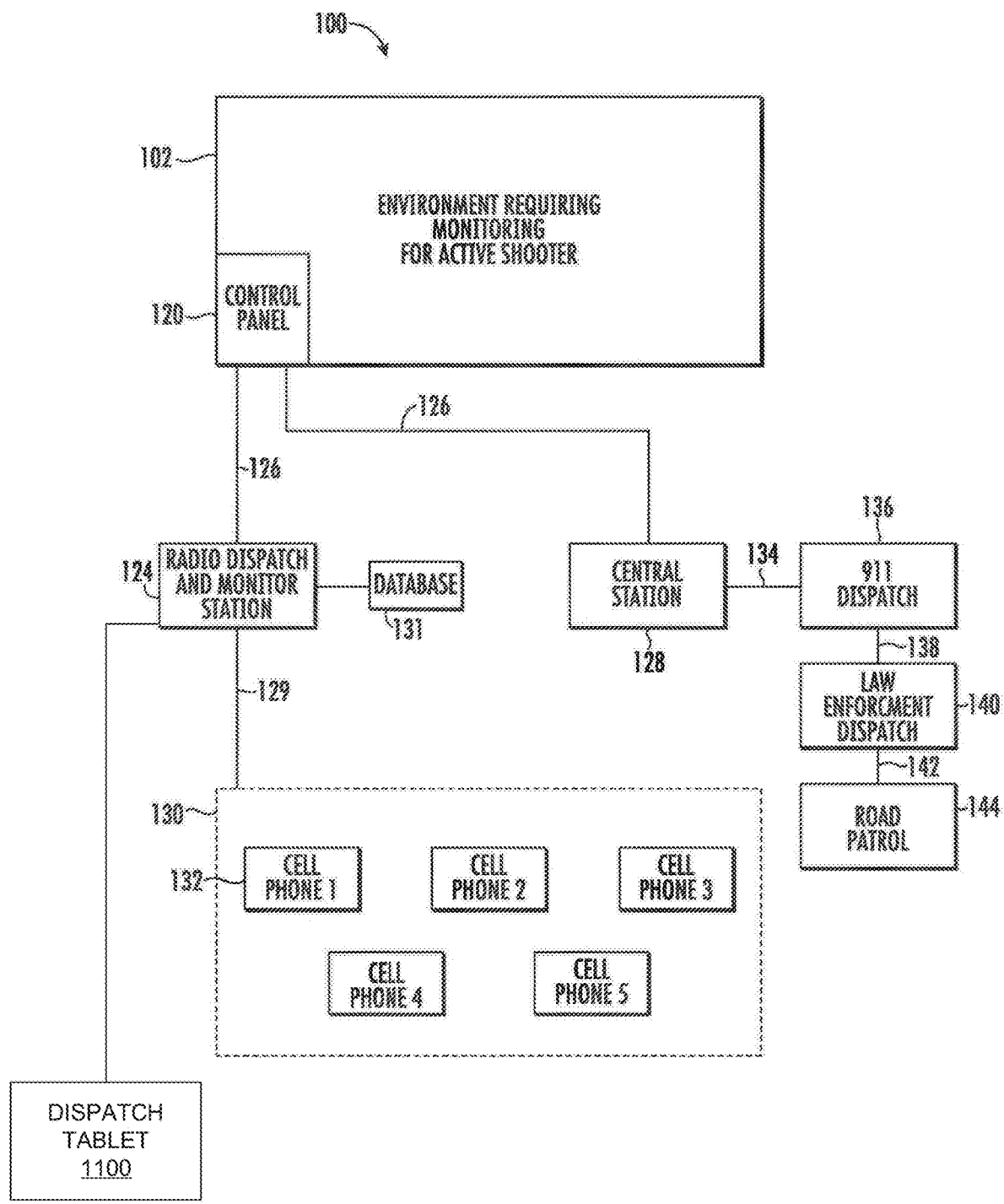
FIG. 17 is an exemplary system block diagram for the dispatch tablet.

FIG. 17 illustrates a system diagram of the alert system showing the notification being sent to the dispatch tablet 1100. FIG. 17 is similar to FIG. 2 but further includes the dispatch tablet. As shown in FIG. 17, the dispatch tablet 17 is in communication with the dispatch and monitor station 124. As discussed above, it will be appreciated that in an alternate embodiment, as discussed above, the tablet may receive notifications directly from the control panel.

The above-described dispatch tablet has several advantages because it provides improved notification to a law enforcement or police dispatch center. No calls are required to notify first responders of the alert or alarm event. Critical information is delivered to law enforcement dispatch within seconds of an alert button being activated at a facility, allowing first responders to dispatch within seconds, not minutes, of the alert button being activated.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for notifying first responders in an active shooter emergency at a site comprising:
   receiving a notification of an activation of a panic button at the site on a tablet located at a law enforcement office or a dispatch center, wherein the notification of the activation comprises a location of the site; and
   in response to receiving the notification of the activation of the panic button at the site, executing dispatch software on the tablet; and
   generating a visual alarm and an auditory alarm on the tablet, wherein the visual alarm comprises a notification of an active shooter emergency at the site and the location of the site,
   wherein the tablet is configured to be used only for notifying first responders in an active shooter emergency.

2. The method of claim 1, further comprising:
   receiving video images from the site and displaying the video images on the tablet.

3. The method of claim 1, wherein the notification further comprises information from one or more sensors at the site and displaying information from the one or more sensors on the tablet.

4. The method of claim 1, wherein the auditory alarm comprises a sound having a decibel level sufficient to alert an individual about the alarm.

5. The method of claim 1, wherein the visual alarm comprises changing a background of a display of the tablet between red and blue.

6. A system for notifying first responders to an active shooter emergency at a site comprising:
   a plurality of panic buttons at a plurality of sites, wherein the plurality of panic buttons are configured to be activated, wherein the plurality of panic buttons are configured to generate a notification that comprises a location in the site corresponding to a location of the activated panic button in the site when it is activated;
   a dispatch and monitor station configured to receive the notification regarding the active shooter emergency from an activated one of the plurality of panic buttons, wherein the notification comprises alarm event data including at least a location of the site and a location of the activated one of the plurality of panic buttons in the site; and
   a tablet at a law enforcement office in cellular communication with the dispatch and monitor station, wherein the tablet is configured to receive alarm event data from the dispatch and monitor station and generate an alarm based on the received alarm event data, and wherein the tablet is configured to be used only for notifying first responders in an active shooter emergency.

7. The system of claim 6, wherein the plurality of panic buttons each comprise a fixed panic button or a portable panic button.

8. The system of claim 6, wherein the dispatch and monitor station further sends information regarding the active shooter emergency to a plurality of first responders.

9. The system of claim 6, wherein the alarm event data further comprises information identifying the alarm as an active shooter emergency.

10. The system of claim 6, wherein the tablet comprises a speaker, and wherein the tablet outputs an auditory alarm.

11. The system of claim 6, wherein the tablet comprises a display that is configured to alternate a background color between red and blue in response to receiving the alarm event data.

12. The system of claim 6, wherein the tablet comprises a display that is configured to display text comprising information describing the alarm event data.

13. The method of claim 1, further comprising verifying the notification is received from an approved source.

14. The system of claim 6, wherein the tablet is further configured to verify the notification is received from an approved source.

* * * * *